United States Patent
Dumas et al.

(10) Patent No.: US 8,671,298 B2
(45) Date of Patent: Mar. 11, 2014

(54) SYSTEM AND METHOD FOR IMPROVING POWER SUPPLY EFFICIENCY

(75) Inventors: Christopher C. Dumas, Austin, TX (US); Ashish Munjal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 368 days.

(21) Appl. No.: 13/029,345

(22) Filed: Feb. 17, 2011

(65) Prior Publication Data

US 2012/0216055 A1 Aug. 23, 2012

(51) Int. Cl.
*G06F 1/26* (2006.01)
*G06F 1/32* (2006.01)

(52) U.S. Cl.
USPC ............. 713/320; 713/300; 713/323; 307/43; 307/80

(58) Field of Classification Search
USPC ........................ 713/300, 320, 323; 307/43, 80
See application file for complete search history.

(56) References Cited

U.S. PATENT DOCUMENTS

| | | | |
|---|---|---|---|
| 7,720,637 B2 | 5/2010 | Brundridge | 702/182 |
| 2009/0217060 A1* | 8/2009 | Tsuchiya | 713/300 |
| 2009/0254768 A1 | 10/2009 | Livescu et al. | 713/320 |

* cited by examiner

*Primary Examiner* — Kim Huynh
*Assistant Examiner* — Michael J Brown
(74) *Attorney, Agent, or Firm* — Baker Botts L.L.P.

(57) ABSTRACT

A method may include: calculating approximate power requirements of components, the components supplied with electrical energy from a plurality of power supplies, each of one or more of the plurality of power supplies capable of being enabled and disabled from supplying electrical energy to the components; determining a set of possible configurations of the plurality of power supplies such that for each possible configuration, enabled power supplies of the possible configuration have adequate aggregate capacity to deliver the approximate power requirements and switching to the possible configuration from a then-present configuration would require no more than one of then-disabled power supplies be enabled and no more than one of then-enabled power supplies be disabled; and determining which of the set of possible configurations has the highest expected power efficiency.

15 Claims, 2 Drawing Sheets

SYSTEM AND METHOD FOR IMPROVING POWER SUPPLY EFFICIENCY

TECHNICAL FIELD

The present disclosure relates in general to power management, and more particularly to a system and method for improving power supply efficiency.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Power supplies are used in information handling systems to provide electrical energy to an information handling system and the various information handling resources thereof. In many applications, power supplies convert alternating current (AC) electrical energy (e.g., from a public power grid) to direct current (DC) electrical energy, and deliver the DC electrical energy to information handling resources via suitable electrical conductors (e.g., one or more power busses coupling information handling resources to the power supplies).

In many implementations, power supplies are capable of being provided in a redundant configuration. For example, power demands of an information handling system (or a collection of a plurality of information handling systems) may require an amount of power significantly less than that of the capacity of the available power supplies. Nonetheless, to ensure adequate power is provided in the event of a failure of an individual power supply, a particular number of power supplies may be enabled (e.g., made "active") so as to provide a desired level of redundancy, despite the fact that the aggregate capacity of the enabled power supplies may be well in excess of that required to satisfy the power requirements of a system.

Oftentimes, for a particular level of redundancy of power capacity requirement for a system, there may exist a configuration of enabled and disabled power supplies such that the particular configuration yields a power efficiency greater than that of another possible configuration satisfying the redundancy and capacity requirements of the system. "Power efficiency" of a power supply may mean the ratio of DC power delivered by a power supply to the AC power supplied to the power supply. "Aggregate power efficiency" of an enabled set of power supplies may mean the ratio of the aggregate DC power delivered by the enabled power supplies to the aggregate AC power supplied to the enabled power supplies.

Traditional approaches to determination of an optimum configuration for power supplies have many disadvantages. For example, for a particular redundancy policy and capacity requirement for a system with six power supplies, there may be $2^6=64$ possible configurations. Calculating efficiency for all of such configurations may require excessive computation that may undesirably tax system resources. In addition, the universe of possible configurations increases as the number of power supplies increase, further increasing complexity in larger systems.

In addition, it may in many cases be undesirable to switch from one configuration to another if such switch involves enabling multiple additional power supplies and/or disabling multiple power supplies. Such enabling and disabling of multiple power supplies may cause a current and/or voltage impulse in a power system that may cause harmful effects to information handling resources and/or the power supplies themselves.

SUMMARY

In accordance with the teachings of the present disclosure, disadvantages and problems associated with configuring power supplies for power efficiency may be substantially reduced or eliminated.

In accordance with embodiments of the present disclosure, as system may include a plurality of power supplies and a management controller in communication with the plurality of power supplies. The plurality of power supplies may be configured to supply electrical energy to components of the system, each of one or more of the plurality of power supplies capable of being enabled and disabled from supplying electrical energy to the components. The management controller may be configured to: (i) calculate approximate power requirements of the components of the system; (ii) determine a set of possible configurations of the plurality of power supplies such that for each possible configuration, enabled power supplies of the possible configuration have adequate aggregate capacity to deliver the approximate power requirements and switching to the possible configuration from a then-present configuration would require no more than one of then-disabled power supplies be enabled and no more than one of then-enabled power supplies be disabled; (iii), determine which of the set of possible configurations has the highest expected power efficiency; (iv) determine whether the possible configuration with the highest expected aggregate power efficiency has an expected aggregate power efficiency greater than the aggregate power efficiency of the then-present configuration; and (v) communicate control signals to one or more of the plurality of power supplies to enable no more than one of then-disabled power supplies and disable no more than one of then-enabled power supplies in order to switch to the possible configuration with the highest expected aggregate power efficiency in response to determining that the possible configuration with the highest expected aggregate power efficiency has an expected aggregate power efficiency greater than the aggregate power efficiency of the then-present configuration.

In accordance with additional embodiments of the present disclosure, a method may be provided. The method may include calculating approximate power requirements of components, the components supplied with electrical energy from a plurality of power supplies, each of one or more of the plurality of power supplies capable of being enabled and disabled from supplying electrical energy to the components.

The method may also include determining a set of possible configurations of the plurality of power supplies such that for each possible configuration, enabled power supplies of the possible configuration have adequate aggregate capacity to deliver the approximate power requirements and switching to the possible configuration from a then-present configuration would require no more than one of then-disabled power supplies be enabled and no more than one of then-enabled power supplies be disabled. The method may additionally include determining which of the set of possible configurations has the highest expected power efficiency. The method may further include determining whether the possible configuration with the highest expected aggregate power efficiency has an expected aggregate power efficiency greater than the aggregate power efficiency of the then-present configuration. Moreover, the method may include communicating control signals to one or more of the plurality of power supplies to enable no more than one of then-disabled power supplies and disable no more than one of then-enabled power supplies in order to switch to the possible configuration with the highest expected aggregate power efficiency in response to determining that the possible configuration with the highest expected aggregate power efficiency has an expected aggregate power efficiency greater than the aggregate power efficiency of the then-present configuration.

In accordance with further embodiments of the present disclosure a program of instructions embodied in a non-transitory computer-readable medium is provided. The program of instructions may be configured to, when executed: (i) calculate approximate power requirements of components, the components supplied with electrical energy from a plurality of power supplies, each of one or more of the plurality of power supplies capable of being enabled and disabled from supplying electrical energy to the components; (ii) determine a set of possible configurations of the plurality of power supplies such that for each possible configuration, enabled power supplies of the possible configuration have adequate aggregate capacity to deliver the approximate power requirements and switching to the possible configuration from a then-present configuration would require no more than one of then-disabled power supplies be enabled and no more than one of then-enabled power supplies be disabled; (iii) determine which of the set of possible configurations has the highest expected power efficiency; (iv) determine whether the possible configuration with the highest expected aggregate power efficiency has an expected aggregate power efficiency greater than the aggregate power efficiency of the then-present configuration; and (v) communicate control signals to one or more of the plurality of power supplies to enable no more than one of then-disabled power supplies and disable no more than one of then-enabled power supplies in order to switch to the possible configuration with the highest expected aggregate power efficiency in response to determining that the possible configuration with the highest expected aggregate power efficiency has an expected aggregate power efficiency greater than the aggregate power efficiency of the then-present configuration.

Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
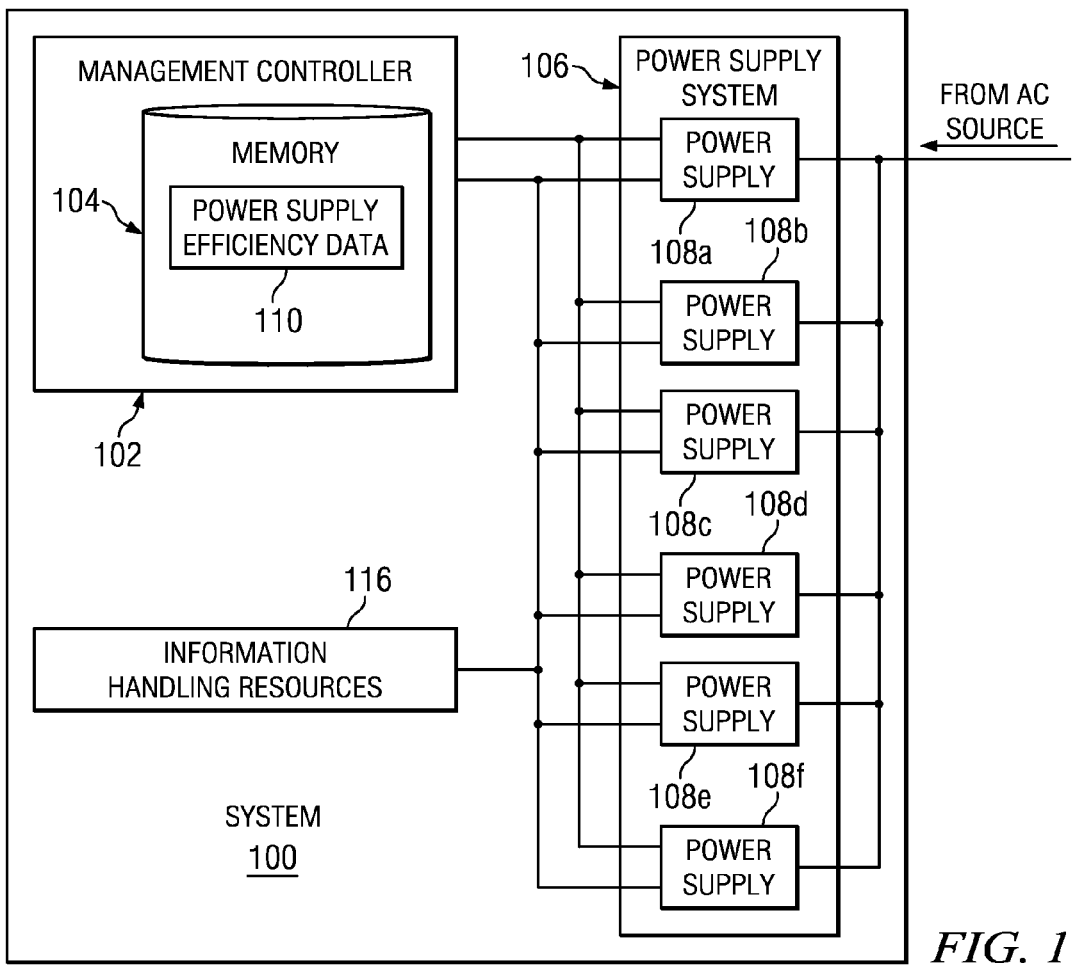
FIG. 1 illustrates a block diagram of an example system, in accordance with embodiments of the present disclosure.
Figure 2:
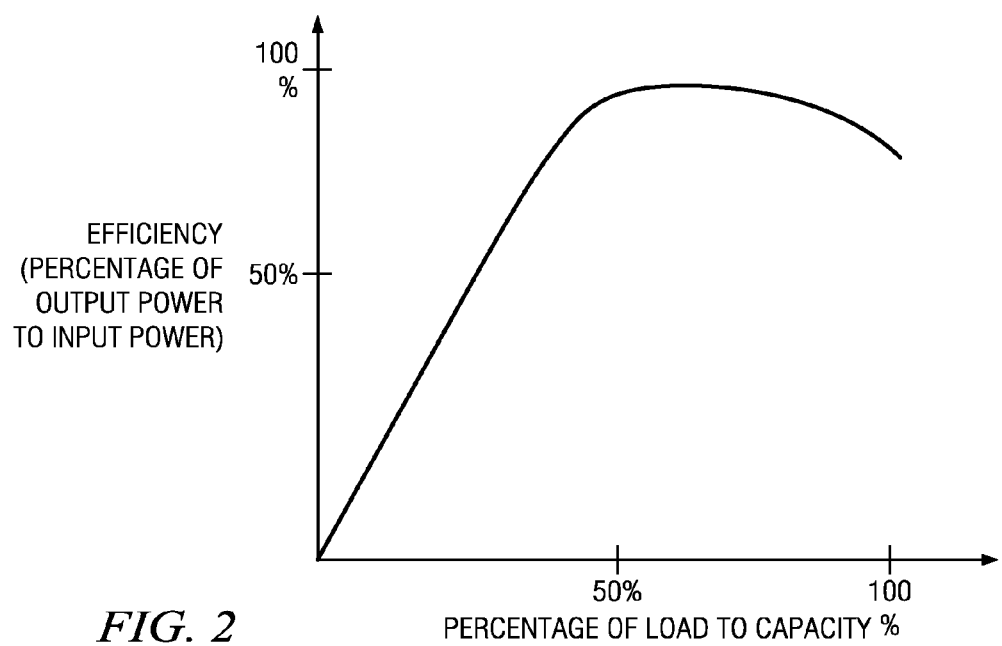
FIG. 2 illustrates an example efficiency curve for a power supply, in accordance with embodiments of the present disclosure.
Figure 3:
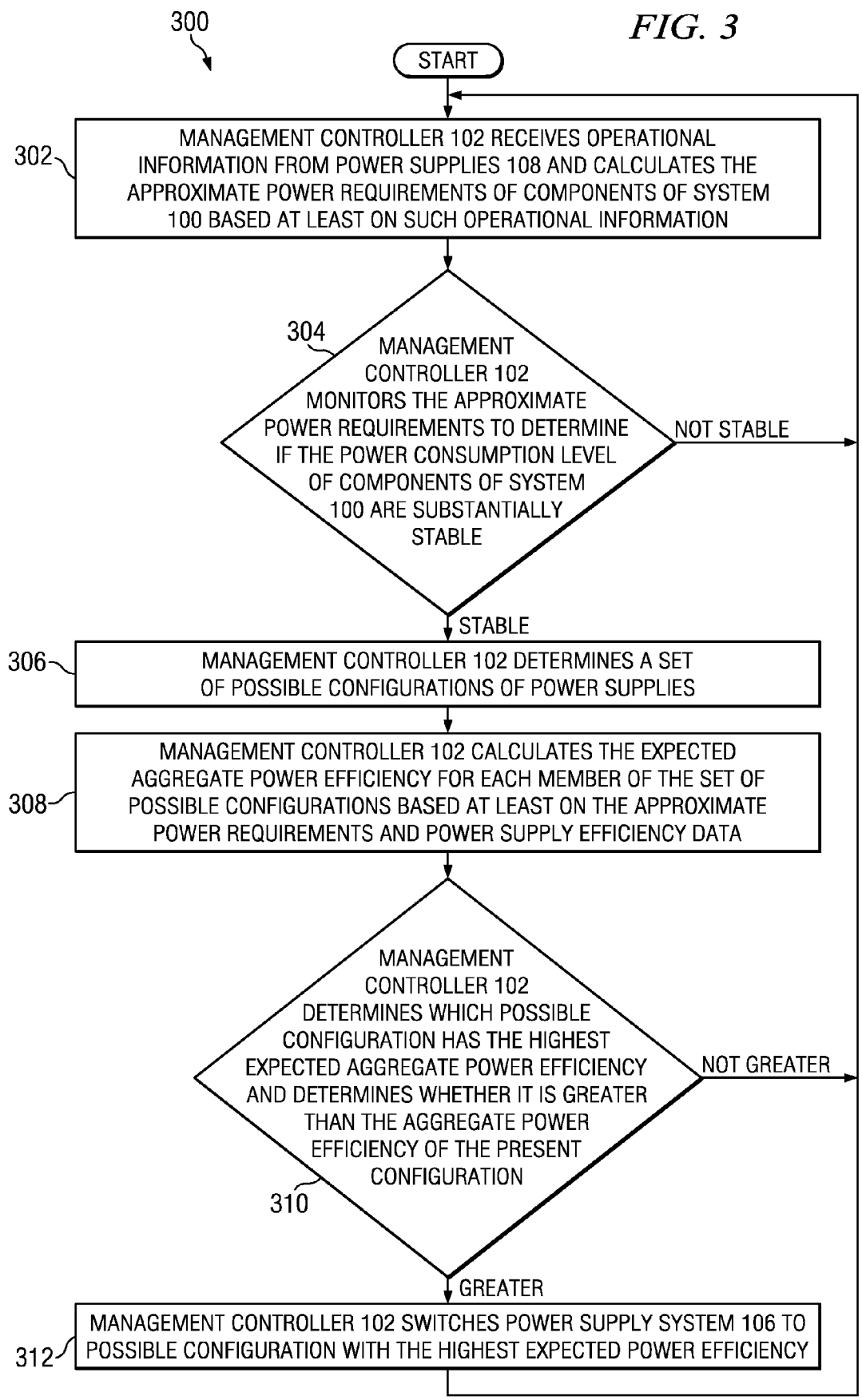
FIG. 3 illustrates a flow chart of a method for improving power supply efficiency, in accordance with embodiments of the present disclosure.

Preferred embodiments and their advantages are best understood by reference to FIGS. 1-3 wherein like numbers are used to indicate like and corresponding parts.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage resource, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

For the purposes of this disclosure, information handling resources may broadly refer to any component system, device or apparatus of an information handling system, including without limitation processors, busses, memories, input-output devices and/or interfaces, storage resources, network interfaces, motherboards, electro-mechanical devices (e.g., fans), displays, and power supplies.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such wires, optical fibers, microwaves, radio waves, and other electromagnetic and/or optical carriers; and/or any combination of the foregoing.

FIG. 1 illustrates a block diagram of an example system 100, in accordance with an embodiment of the present disclosure. System 100 may represent any suitable system having one or more information handling systems and/or information handling resources. For example, in some embodiments, system 100 may represent a chassis comprising a plurality of servers (e.g., blades) or a plurality of such chasses. In other embodiments, system 100 may represent a storage enclosure comprising a plurality of storage resources (e.g., a plurality of hard disk drives) or a plurality of such enclosures. In other embodiments, system 100 may represent a telecom, network or fibre-channel storage area network (SAN) switch with multiple power supply units.

As depicted, system 100 may include a management controller 102, one or more information handling resources 116, and a power supply system 106. Management controller 102 may be any system, device, or apparatus configured to facilitate management and/or control of system 100, its component information handling resources 116, and power supplies 108a-f of power supply system 106. Management controller 102 may be configured to issue commands and/or other signals to manage and/or control information handling resources 116 and/or power supplies 108a-f. Management controller 102 may comprise a microprocessor, microcontroller, digital signal processor (DSP), application specific integrated circuit (ASIC), field programmable gate array (FPGA), erasable programmable read-only memory (EPROM), or any combination thereof. In certain embodiments, management controller 102 may include or be an integral part of a chassis management controller in a chassis. In other embodiments, management controller 102 may include or be an integral part of a storage controller in a storage enclosure. In other embodiments, management controller 102 may include or be an integral part of a telecom, network or fibre-channel SAN switch with multiple power supplies.

As depicted in FIG. 1, management controller 102 may include a memory 104. Memory 104 may comprise any system, device, or apparatus operable to retain program instructions or data for a period of time (e.g., computer-readable media). Memory 104 may comprise random access memory (RAM), electrically erasable programmable read-only memory (EEPROM), a PCMCIA card, flash memory, magnetic storage, opto-magnetic storage, or any suitable selection and/or array of volatile or non-volatile memory that retains data after power to memory 104 is withdrawn. As shown, memory 104 may include power supply efficiency data 110. Power supply efficiency data 110 may include data regarding the power efficiency of each of one or more of power supplies 108a-f at a plurality of operational states, wherein power efficiency of a power supply may be defined as the ratio of the power delivered at the output of a power supply 108 to the power received at the input of a power supply 108. In some embodiments, power supply efficiency data 110 for a power supply 108 may be representative of an efficiency curve of efficiency versus percentage of power load to power capacity for such power supply 108.

An example of an efficiency curve for a power supply 108 is depicted in FIG. 2. As shown in FIG. 2, an efficiency curve may, for a particular power supply 108, represent the efficiency of the particular power supply 108 expressed as a percentage of output power to input power for the power supply 108 (vertical axis) as a function of the percentage of load power to load capacity for the power supply (horizontal axis). Efficiency data for a power supply 108, including an efficiency curve for a power supply 108, may be complied in any suitable manner, including without limitation based on experimentation conducted by a manufacturer of power supply 108 and/or experimentation conducted by a manufacturer or architect of system 100.

Information handling resources 116 may be communicatively coupled to management controller 102 and may also be electrically coupled to power supplies 108a-f. Information handling resources 116 may include any component system, device or apparatus of an information handling system, including without limitation one or more processors, busses, computer-readable media (e.g., memories and storage resources), input-output devices and/or interfaces, network interfaces, motherboards, electro-mechanical devices (e.g., fans), displays, and/or power supplies.

Power supply system 106 may be any suitable collection of power supplies 108. As shown in FIG. 1, power supply system 106 may include one or more power supplies 108. A power supply 108 may include any device, system, or apparatus operable to supply electrical energy to management controller 102, information handling resources 116, and/or other components of system 100 via a power bus and/or any other suitable network of electrical conduits. In some embodiments, one or more power supplies 108 may be configured to convert alternating current (AC) electrical energy received at their inputs to direct current (DC) electrical energy to be delivered to components of system 100.

In addition or alternatively, one or more power supplies 108 may be communicatively coupled to management controller 102 via a communication bus and/or other suitable communication path. As an example, in some embodiments, management controller 102 and power supplies 108 may be coupled via a Power Management Bus (PMBus). Such communicative coupling may allow communication of control signals and/or data between management controller 102 and power supplies 108. For example, in some embodiments, management controller 102 may communicate control signals to one or more of power supplies 108 in order to selectively enable or disable individual power supplies 108. In the same or alternative embodiments, power supplies 108 may communicate to management controller 102 data regarding operation of power supplies 108 (e.g., input power consumed by a power supply 108, output power delivered by a power supply 108, etc.).

Although the embodiment shown in FIG. 1 depicts power supply system 106 having six power supplies 108a-f, power supply system 106 may have any number of power supplies 108. In addition, in certain embodiments, power supply system 106 may be a redundant power supply system, in which a number of power supplies 108 of aggregate capacity sufficient to supply power demands to system 100 may be enabled, as well as one or more additional power supplies 108 to provide redundancy in the event of a failure or one or more of the enabled power supplies 108. Redundancy in power supply system 106 may be maintained in accordance with a redundancy policy. For example, in some instances, power supplies 108 may be maintained in an N+1 redundancy configuration, in which a number of power supplies 108 having aggregate capacity sufficient to provide the power requirements of system 100 are enabled, in addition to another power supply 108 with capacity sufficient to, in the event of a failure of one of the power supplies 108, provide the power requirements of the failed power supply 108. In other instances, power supplies 108 may be maintained in an N+N redundancy configuration, in which a number of power supplies 108 having aggregate capacity sufficient to provide two times the power requirements of system 100 are enabled. Other redundancy policies other than N+1 and N+N may also be employed.

In operation, management controller 102 may receive operational information from power supplies 108 and determine the aggregate input power consumed and/or aggregate output power delivered by power supplies 108 (either of which may be indicative of the power requirements for system 100) for the then-current configuration of power supply system 106. "Configuration" as used in this context may mean the identification of the power supplies 108 enabled and disabled. Based on such power requirements (and in some embodiments, a redundancy policy for power supply system 106), management controller 102 may calculate an approximate aggregate power efficiency for each of a set of possible configurations, wherein "aggregate power efficiency" means the ratio of the aggregate output power supplied by enabled power supplies 108 of the particular configuration to the aggregate input power consumed by enabled power supplies 108 of the particular configuration. The set of possible configurations may be those in which no more than one of the then-disabled power supplies 108 is enabled and/or no more than one of the then-enabled power supplies 108 is disabled. Management controller 102 will determine whether the then-current configuration or one of the set of possible configurations has the highest efficiency, and then enable up to one of the then-disabled power supplies and/or disable up to one of the then disabled power supplies. The operation of system 100 may be further illustrated in FIG. 3.

FIG. 3 illustrates a flow chart of a method 300 for improving power supply efficiency, in accordance with an embodiment of the present disclosure. According to one embodiment, method 300 preferably begins at step 302. As noted above, teachings of the present disclosure may be implemented in a variety of configurations of system 100. As such, the preferred initialization point for method 300 and the order of the steps 302-312 comprising method 300 may depend on the implementation chosen.

At step 302, management controller 102 may receive operational information from power supplies 108 and calculate the approximate power requirements of components of system 100 based at least on such operational information. For example, in some embodiments, each of one or more of power supplies 108 may communicate to management controller 102 information regarding the power delivered by the power supply 108, from which management controller 102 may calculate the approximate power requirements of components of system 100 by aggregating the power delivered for the individual power supplies 108. In the same or alternative embodiments, each of one or more of power supplies 108 may communicate to management controller 102 the information regarding the input power consumed by the power supply 108. Based on this information and power supply efficiency data 110 associated with a particular power supply 108, management controller 102 may determine the approximate power delivered by the particular power supply 108 (e.g., by multiplying the power consumed by a power supply 108 by the efficiency of such power supply 108 at such power consumption level). By aggregating the approximate power delivered of the individual power supplies 108, management controller 102 may calculate the approximate power requirements of components of system 100.

At step 304, management controller 102 may monitor the approximate power requirements to determine if the power consumption of components of system 100 is substantially stable or diminishing. For example, power consumption levels may be unstable in periods in which one or more information handling resources 116 are coming online. Accordingly, the power consumption level may be deemed substantially stable if the approximate power requirements remain within a particular range (e.g., 50 watts) for a particular period of time (e.g., 15 minutes). If power consumption is substantially stable, method 300 may proceed to step 306. Otherwise, if power consumption is not substantially stable, method 300 may proceed again to step 302 and perform a loop comprising steps 302 and 304 substantial stability is achieved.

At step 306, management controller 102 may determine a set of possible configurations of power supplies 108 in which: (i) each configuration has adequate capacity to deliver the approximate power requirements, and (ii) no more than one of the then-disabled power supplies 108 is enabled and/or no more than one of the then-enabled power supplies 108 is disabled. In some embodiments, the set of possible configurations may also include those configurations in which criteria (i) and (ii) of the previous sentence are met, in addition to satisfying an applicable redundancy policy. As a solely illustrative example, if the present configuration of power supply system 106 includes power supplies 108a-108c enabled (e.g., active) and power supplies 108d-108f disabled (e.g., standby), the set of possible configurations may include:

a) configurations in which one then-enabled power supply 108 is disabled, leaving two enabled power supplies 108 (provided that such configurations have capacity to deliver power requirements and, if applicable, satisfy redundancy policy)—
  i) power supplies 108a and 108b enabled, all others disabled;
  ii) power supplies 108a and 108c enabled, all others disabled; and
  iii) power supplies 108b and 108c enabled, all others disabled;
b) configurations in which one then-enabled power supply 108 is disabled and one then-disabled power supply 108 is enabled, leaving three enabled power supplies 108 (provided that such configurations have capacity to deliver power requirements and, if applicable, satisfy redundancy policy)—
  i) power supplies 108a, 108b and 108d enabled, all others disabled;
  ii) power supplies 108a, 108b and 108e enabled, all others disabled;
  iii) power supplies 108a, 108b and 108f enabled, all others disabled;
  iv) power supplies 108a, 108c and 108d enabled, all others disabled;
  v) power supplies 108a, 108c and 108e enabled, all others disabled;
  vi) power supplies 108a, 108c and 108f enabled, all others disabled;
  vii) power supplies 108b, 108c and 108d enabled, all others disabled;
  viii) power supplies 108b, 108c and 108e enabled, all others disabled; and
  ix) power supplies 108b, 108c and 108f enabled, all others disabled; and
c) configurations in which one then-disabled power supply 108 is enabled, leaving four enabled power supplies 108—
  i) power supplies 108a, 102b, 102c, and 102d enabled, all others disabled;
  ii) power supplies 108a, 102b, 102c, and 102e enabled, all others disabled; and
  iii) power supplies 108a, 102b, 102c, and 102f enabled, all others disabled.

At step 308, management controller 102 may, based at least on the approximate power requirements and power supply efficiency data, calculate the expected aggregate power efficiency for each member of the set of possible configurations. For example, for each possible configuration, management controller 102 may determine the individual power efficiency for each enabled power supply 108 of the possible configuration at such power supply's expected power output level in the configuration by reference to power supply efficiency data 110. The "expected power output level" of a power supply 108 may be calculated by weighting each enabled power supply 108 of a possible configuration in accordance with the ratio of its power capacity to the aggregate power capacity of all enabled power supplies 108 of the possible configuration, and multiplying such ratio by the approximate power requirements. In equation form, this approach to calculating expected power output level for a power supply 108 may take the form of:

$$Pi = \frac{Cap_i \cdot P_{TOT}}{\sum_{i \in K} Cap_i}$$

where $P_i$ is the expected output level of an enabled power supply i, $Cap_i$ is the capacity of an enabled power supply i, $P_{TOT}$ is the approximate power requirements of components of system 100, and K is the set of enabled power supplies 108 for the possible configuration.

In some embodiments, expected aggregate power efficiency for a possible configuration may include calculating the individual power efficiency for each enabled power supply of the possible configuration and weighting each individual power efficiency of each enabled power supply 108 of the possible configuration in accordance with the ratio of its power capacity to the aggregate power capacity of all enabled power supplies 108 of the possible configuration. For example, using such a weighted approach, expected aggregate power efficiency of a potential configuration may be given by the equation:

$$Eff_{TOT} = \frac{\sum_{i \in K}(Eff_i \cdot Cap_i)}{\sum_{i \in K} Cap_i}$$

where $Eff_{TOT}$ is the expected aggregate power efficiency of a possible configuration, $Eff_i$ is the individual efficiency of an enabled power supply i at its expected power output level in the possible configuration, $Cap_i$ is the capacity of an enabled power supply i, and K is the set of enabled power supplies 108 for the possible configuration.

At step 310, management controller 102 may determine which possible configuration has the highest expected aggregate power efficiency and determine whether it is greater than the aggregate power efficiency of the present configuration. If the possible configuration with the highest expected power efficiency is greater than the aggregate power efficiency of the present configuration, method 300 may proceed to step 312. Otherwise, method 300 may proceed again to step 302, such that method 300 may be repeated.

At step 312, management controller 102 may, in response to determining that the possible configuration with the highest expected power efficiency is greater than the aggregate power efficiency of the present configuration, switch power supply system 106 to the possible configuration with the highest expected power efficiency by selectively enabling a then-disabled power supply 108 and/or disabling a then-enabled power supply 108. After completion of step 312, method 300 may proceed again to step 302, such that method 300 may be repeated.

Although FIG. 3 discloses a particular number of steps to be taken with respect to method 300, it is understood that method 300 may be executed with greater or lesser steps than those depicted in FIG. 3. For example, in some embodiments, step 310 and 312 may be implemented as a loop in which an expected aggregate power efficiency for an individual possible configuration may be calculated during each pass of the loop. In addition, although FIG. 3 discloses a certain order of steps to be taken with respect to method 300, the steps comprising method 300 may be completed in any suitable order.

Notably, after the completion of step 310 or 312, method 300 is depicted as beginning again at step 302. Consistent with this depiction, after completion of steps 310 or 312, method 300 may periodically execute at regular intervals (e.g., every fifteen minutes, every hour, etc.) in order that management controller 102 may improve power supply efficiency in a practically continuous manner.

Method 300 may be implemented using system 100 or any other system operable to implement method 300. In certain embodiments, method 300 may be implemented partially or fully in software embodied in computer-readable media.

The systems and methods disclosed herein may substantially reduce or eliminate disadvantages and problems associated with configuring power supplies for power efficiency. For example, by limiting transition from one configuration to another possible configuration requiring no more than enabling of a disabled power supply and/or disabling of an enabled power supply, the solution set for calculating a more efficient configuration is greatly reduced, thus reducing processing requirements (e.g., in the example discussed above with respect to step 306 of method 300, the solution set is 12 possible configurations, compared to $2^6=64$ possible configurations if each permutation of enabled and disabled power supplies were evaluated). In addition, by limiting transition from one configuration to another possible configuration requiring no more than enabling of a disabled power supply and/or disabling of an enabled power supply, electrical impulses that may occur as a result of switching to other configurations may be eliminated or reduced, thus potentially eliminating or reducing erratic voltages, erratic currents, or other undesirable effects from a power distribution system. In addition, by periodically reevaluating expected power efficiencies of possible configurations, further optimal solution may be discovered after arrival at a previously optimal solution.

Although the present disclosure has been described in detail, it should be understood that various changes, substitutions, and alterations can be made hereto without departing from the spirit and the scope of the invention as defined by the appended claims.

What is claimed is:

1. A system comprising:
    a plurality of power supplies to supply electrical energy to components of the system, each of the plurality of power supplies capable of being enabled and disabled from supplying electrical energy to the components;
    a management controller in communication with the plurality of power supplies and to:
        determine estimated power requirements of the components of the system;
        determine a set of configurations of the plurality of power supplies, wherein for a configuration in the set of configurations:
            enabled power supplies of the configuration have adequate aggregate power capacity to deliver the estimated power requirements; and
            switching to the configuration from a previous configuration includes:
                enabling no more than one previously disabled power supply; and
                disabling no more than one previously enabled power supply;
        determine a first configuration in the set of configurations having a maximum power efficiency;

when the first configuration has an aggregate power efficiency greater than the previous configuration, communicate control signals to the plurality of power supplies to switch to the first configuration; and
estimate an aggregate power efficiency for the first configuration based at least on power requirements and power supply efficiency data for enabled power supplies of the first configuration, wherein the aggregate power efficiency is equal to a weighted sum of individual power efficiencies of enabled power supplies of the first configuration, wherein an addend of the weighted sum is equal to a power efficiency of a first enabled power supply multiplied by a ratio of a power capacity of the first enabled power supply to the aggregate power capacity of the enabled power supplies of the first configuration, and wherein the power efficiency of the first enabled power supply is determined at a power output level satisfying the estimated power requirements.

2. A system according to claim 1, wherein the management controller to determine the set of configurations includes the management controller to:
determine that enabled power supplies of the first configuration have adequate aggregate power capacity to satisfy a redundancy policy for the plurality of power supplies.

3. A system according to claim 1, wherein the management controller is to:
receive operational information from the plurality of power supplies; and
determine the estimated power requirements of the components of the system based on the received operational information.

4. A system according to claim 1, wherein the power supply efficiency data indicate efficiency versus percentage of power load to power capacity for at least some of the plurality of power supplies.

5. A system according to claim 1, wherein the power output level of the first enabled power supply is equal to the estimated power requirements multiplied by a ratio of the power capacity of the first enabled power supply to the aggregate power capacity of the enabled power supplies of the configuration.

6. A method comprising:
determining estimated power requirements of components, the components supplied with electrical energy from a plurality of power supplies, each of the plurality of power supplies capable of being enabled and disabled from supplying electrical energy to the components;
determining a set of configurations of the plurality of power supplies wherein for a configuration in the set of configurations:
enabled power supplies of the configuration have adequate aggregate power capacity to deliver the estimated power requirements; and
switching to the configuration from a previous configuration includes:
enabling no more than one previously disabled power supplies; and
disabling no more than one previously enabled power supplies;
determining a first configuration in the set of configurations having a maximum power efficiency;
when the first configuration has an aggregate power efficiency greater than the previous configuration, communicating control signals the plurality of power supplies to switch to the first configuration; and
estimating an aggregate power efficiency for the first configuration based at least on power requirements and power supply efficiency data for enabled power supplies of the first configuration, wherein the expected aggregate power efficiency is equal to a weighted sum of individual power efficiencies of enabled power supplies of the first configuration, wherein an addend of the weighted sum is equal to a power efficiency of a first enabled power supply multiplied by a ratio of a power capacity of the first enabled power supply to the aggregate power capacity of the enabled power supplies of the first configuration, and wherein the power efficiency of the first enabled power supply is determined at a power output level satisfying the estimated power requirements.

7. A method according to claim 6, further comprising:
determining that enabled power supplies of the first configuration have adequate aggregate power capacity to satisfy a redundancy policy for the plurality of power supplies.

8. A method according to claim 6, further comprising:
receiving operational information from the plurality of power supplies; and
determine the estimated power requirements of the components of the system based on the received operational information.

9. A method according to claim 6, wherein the power supply efficiency data indicate efficiency versus percentage of power load to power capacity for at least some of the plurality of power supplies.

10. A method according to claim 6, wherein the power output level of the first enabled power supply is equal to the estimated power requirements multiplied by a ratio of the power capacity of the first enabled power supply to the aggregate power capacity of the enabled power supplies of the configuration.

11. A non-transitory computer-readable memory media storing processor executable instructions, the instructions to, when executed:
determine estimated power requirements of components of an information handling system, the components supplied with electrical energy from a plurality of power supplies, each of the plurality of power supplies capable of being enabled and disabled from supplying electrical energy to the components;
determine a set of configurations of the plurality of power supplies wherein for a configuration in the set of configurations:
enabled power supplies of the configuration have adequate aggregate power capacity to deliver the estimated power requirements; and
switching to the configuration from a previous configuration includes:
enabling no more than one previously disabled power supply; and
disabling no more than one previously enabled power supply;
determine a first configuration in the set of configurations having a maximum power efficiency;
when the first configuration has an aggregate power efficiency greater than the previous configuration, communicate control signals to the plurality of power supplies to switch to the first configuration; and
estimate an aggregate power efficiency for the first configuration based at least on the power requirements and power supply efficiency data for enabled power supplies of the first configuration, wherein the aggregate power efficiency is equal to a weighted sum of individual power efficiencies of enabled power supplies of the first configuration, wherein an addend of the weighted sum is equal to a power efficiency of a first enabled power supply multiplied by a ratio of a power capacity of the first enabled power supply to the aggregate power capacity of the enabled power supplies of the first configuration, and wherein the power efficiency of the first enabled power supply is determined at a power output level satisfying the estimated power requirements.

12. A memory media according to claim 11, storing instructions further to, when executed:
   determine that enabled power supplies of the first configuration have adequate aggregate power capacity to satisfy a redundancy policy for the plurality of power supplies.

13. A memory media according to claim 11, storing instructions further to, when executed:
   determine the estimated power requirements of the components of the information handling system based on operational information received from the plurality of power supplies.

14. A memory media according to claim 11, wherein the power supply efficiency data indicate efficiency versus percentage of power load to power capacity for at least some of the plurality of power supplies.

15. A memory media according to claim 14, wherein:
   the power output level of the first enabled power supply is equal to the estimated power requirements multiplied by a ratio of the power capacity of the first enabled power supply to the aggregate power capacity of the enabled power supplies of the configuration.

* * * * *